(12) United States Patent
Barrow

(10) Patent No.: US 8,265,338 B2
(45) Date of Patent: Sep. 11, 2012

(54) SYSTEM AND METHOD FOR ANALYSIS OF IMAGE DATA

(75) Inventor: William H. Barrow, Clermont, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 691 days.

(21) Appl. No.: 12/497,294

(22) Filed: Jul. 2, 2009

(65) Prior Publication Data

US 2011/0002505 A1    Jan. 6, 2011

(51) Int. Cl.
*G06K 9/00* (2006.01)
*G02B 27/14* (2006.01)

(52) U.S. Cl. .............................. 382/103; 359/638
(58) Field of Classification Search .................. 382/103, 382/236, 260–264; 356/300, 303, 319, 320, 356/451, 923; 359/201.1, 207.8, 211.1, 211.2, 438, 485.06, 638, 640, 678, 831; 250/354.1; 702/76

See application file for complete search history.

(56) References Cited

U.S. PATENT DOCUMENTS

| | | | | |
|---|---|---|---|---|
| 4,136,954 A | * | 1/1979 | Jamieson | 356/456 |
| 5,926,283 A | * | 7/1999 | Hopkins | 356/419 |
| 6,646,799 B1 | * | 11/2003 | Korniski et al. | 359/407 |

* cited by examiner

*Primary Examiner* — Abolfazl Tabatabai
(74) *Attorney, Agent, or Firm* — Birch, Stewart, Kolasch & Birch, LLP

(57) ABSTRACT

A method and apparatus for optical damage assessment using an existing imaging focal plane array and a fixed or moving set of optics and filters. Advantages include cost reductions and improved reliability due to fewer components and therefore fewer points of failure.

32 Claims, 7 Drawing Sheets

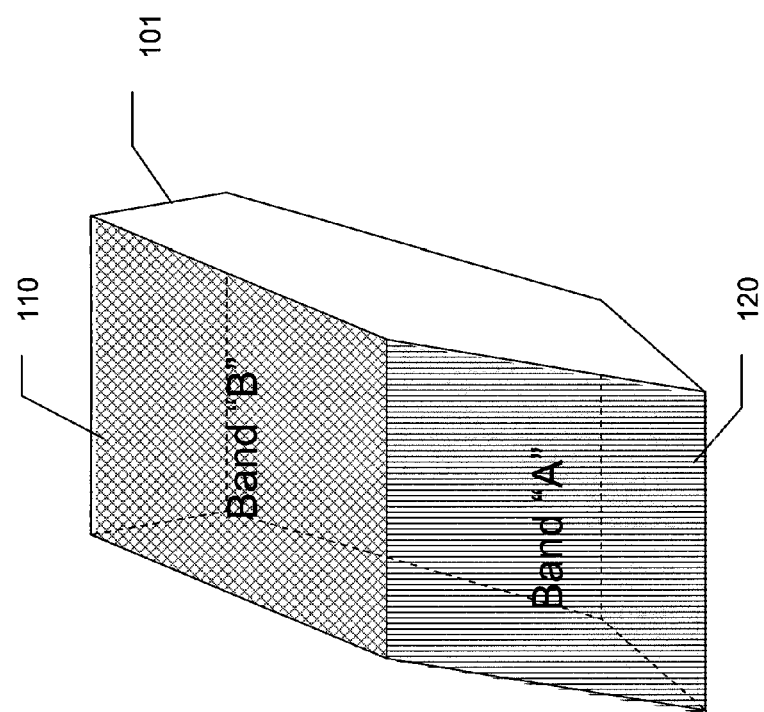

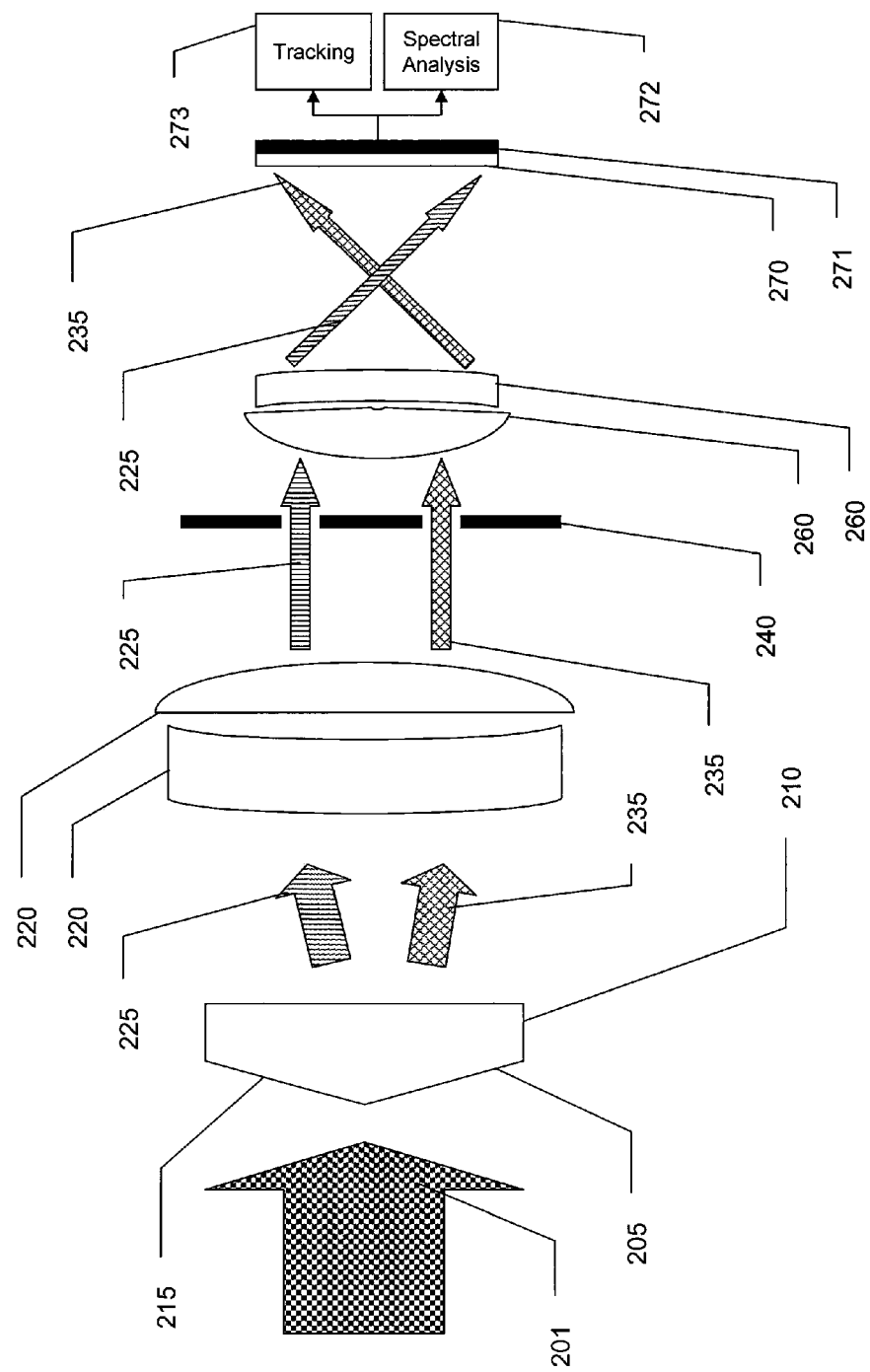

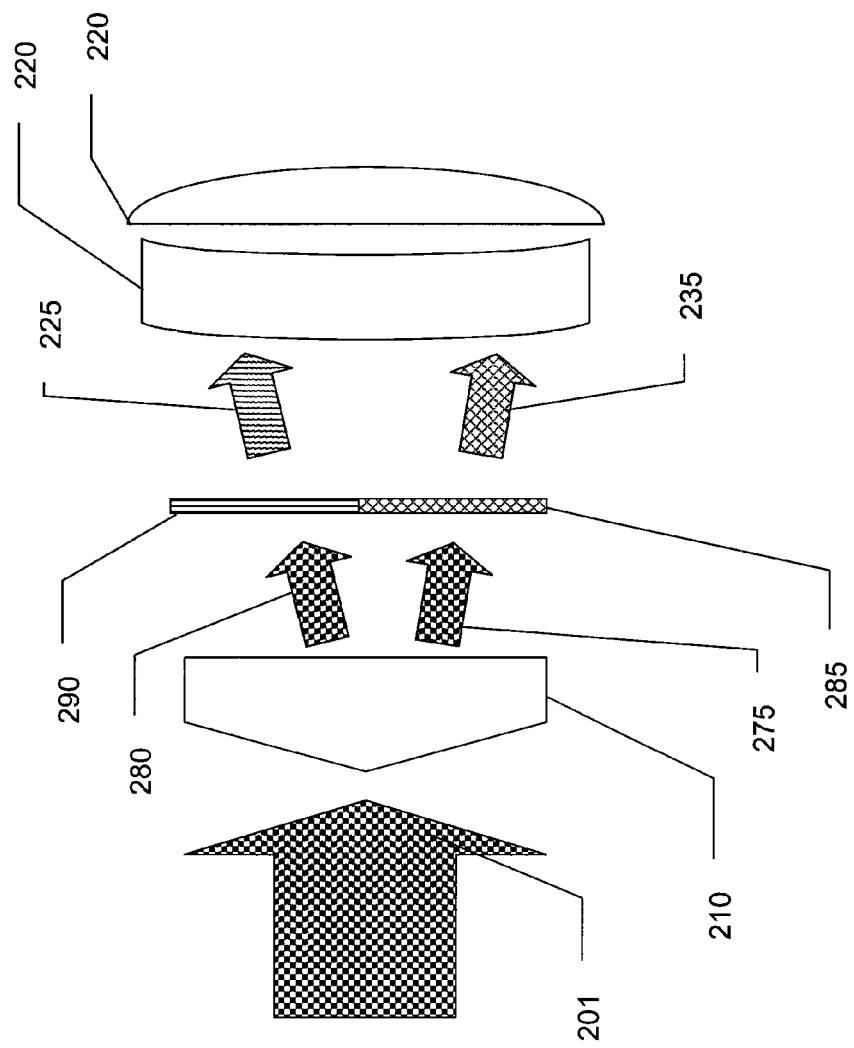

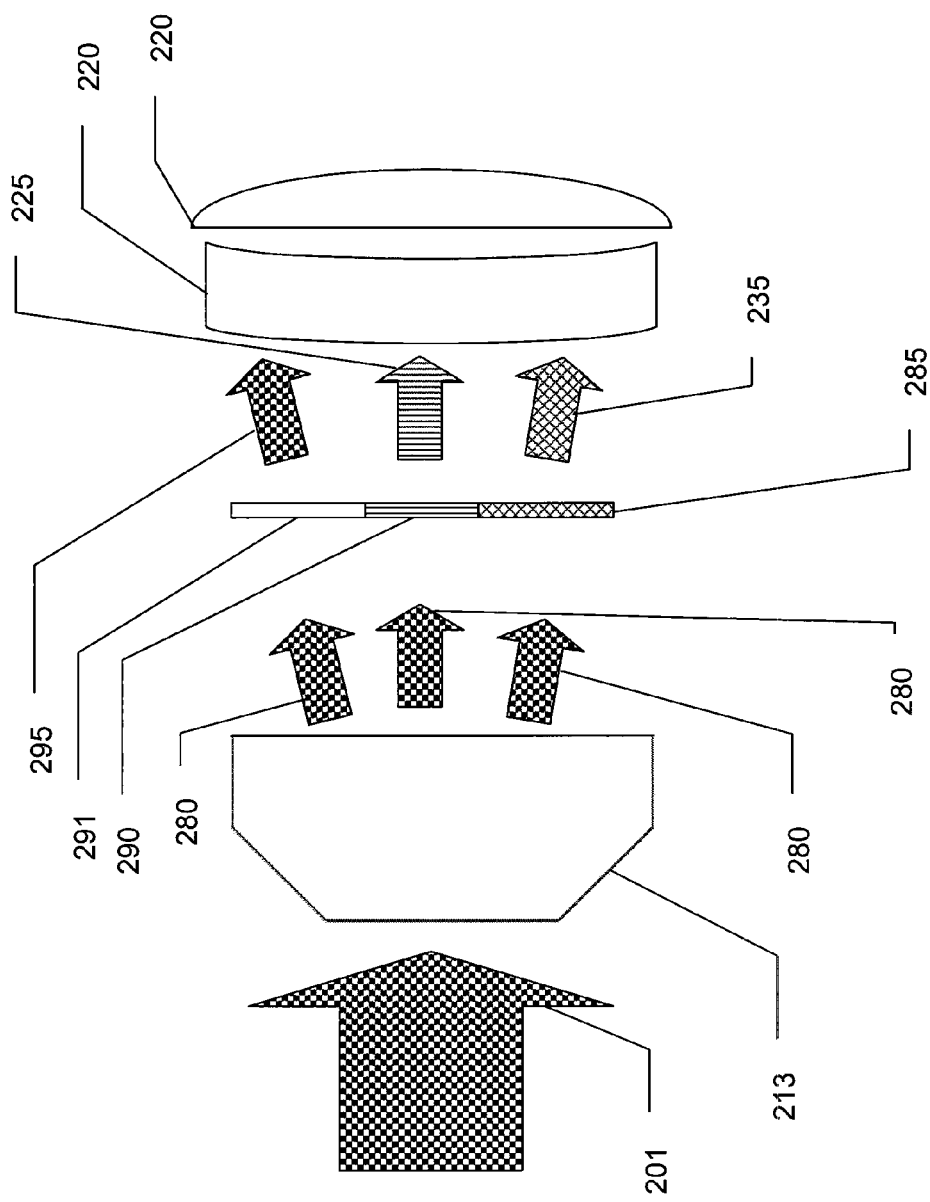

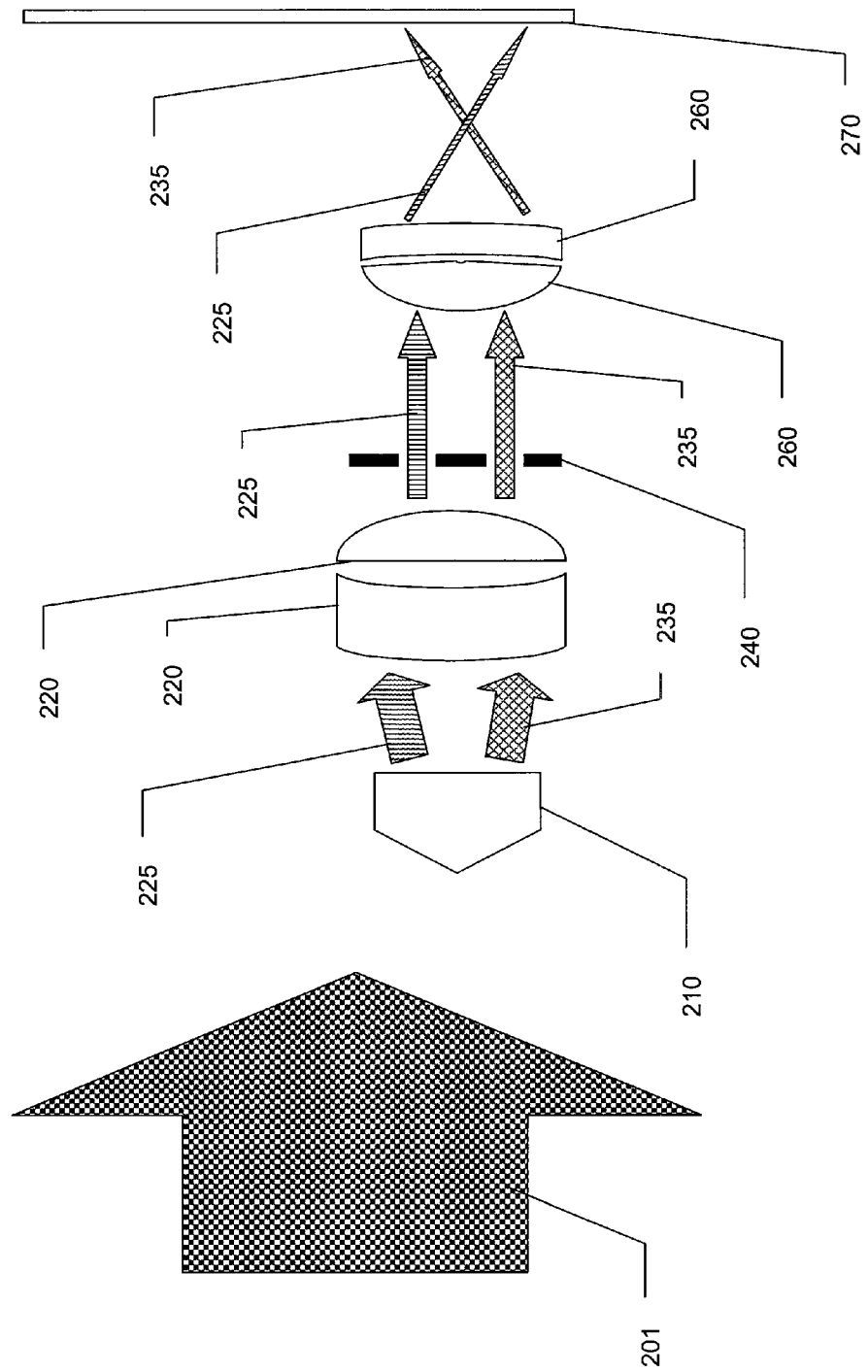

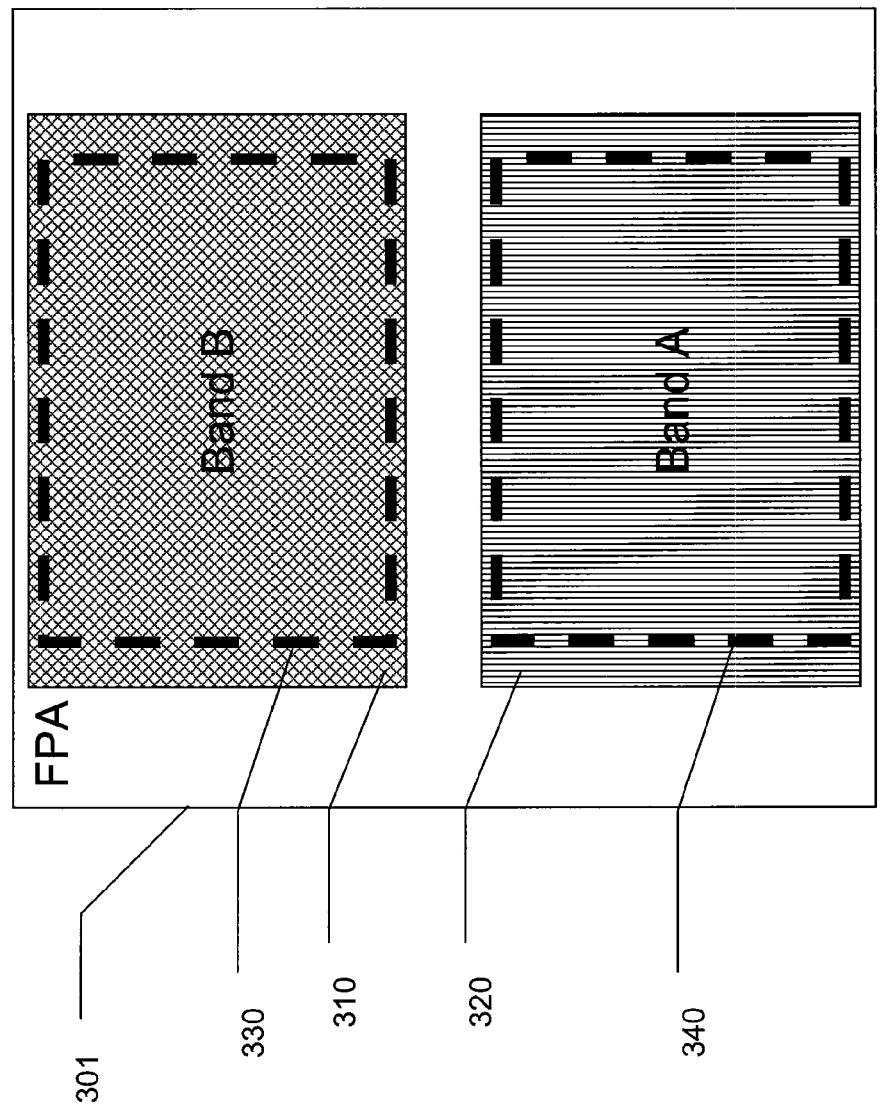

SYSTEM AND METHOD FOR ANALYSIS OF IMAGE DATA

BACKGROUND OF THE INVENTION

1. Field of the Invention

The present invention relates generally to splitting and segregating multiple fields of view on a single focal plane array and, more particularly, to methods and apparatus for performing image analysis and object tracking using refractive optical components in imaging systems.

2. Description of Related Art

Image analysis techniques such as optical damage assessment currently require receiving scene data in at least two different wavebands and analyzing the data in each waveband to determine spectral content of a damage-causing event and in turn, determine the outcome of that event. Some current optical damage assessment systems employ two discrete detection systems—one for object tracking and one for optical damage assessment. The damage assessment system is typically composed of two detectors, each with thermoelectric coolers, two imaging lenses, a circuit board, and two dichroic beam splitters in the optical path. Such solutions have several significant issues associated with cost and weight, and power dissipation as well as the added risk of system failure due to the presence of more parts.

SUMMARY OF THE INVENTION

Aspects of the present invention are directed at solving the problems of cost, weight, and number of components required in an optical damage assessment system. An embodiment of the present invention employs a prism to split incoming wavelengths into multiple, wave-band specific beams and process those beams through a common lens group, projecting both onto separate portions of a single detector array. The use of a single detector and common lens group effectively halves the cost and weight of such a system.

Alternative embodiments of the present invention may also increase the sampling rate of the detector by employing separate output channels for each separate region or by using a "windowing" technique to address specific pixel regions on a detector, thereby reducing the integration time required. Such an approach may compensate for loss of image resolution by facilitating downstream super-resolution or other image signal quality enhancements that may be accomplished as a result of a higher data sampling rate.

Also, a higher frame rate may permit a better assessment of energy distribution and damage profile over a more precise and detailed time window, potentially allowing for better analysis and review of the effects of damage-causing devices such as shaped, delayed, or altitude, depth, or pressure sensitive charges.

Embodiments of the present invention may specifically focus on spectral bands in the infra-red spectrum, and may specifically focus on certain wavebands that are most closely indicative of the energy released by an explosive charge.

Embodiments of the present invention may employ a prism with narrow band-pass filter coatings, or may employ achromatic prisms, to reduce lateral chromatic aberrations associated with passing a broad-spectrum signal through the prism.

Yet further embodiments of the present invention may employ diffractive prisms, such as ones made of materials such as glasses or polycarbonates of varying density, or any other optically suitable material transparent to the required wavelengths, to further reduce these types of lateral chromatic aberrations.

Embodiments of the present invention may employ a fixed-position beam splitting device that totally eliminates any moving parts and allows for constant, ongoing monitoring of wavebands associated with damage-causing events such as detonations. Other embodiments may employ a single, moveable beam splitting device that is moved into the beam path when damage assessment functionality is required in an imaging system. Yet further embodiments of the present invention may employ stationary or moveable mirrors, or other reflective surfaces or devices, as part of a beam splitting device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus are not limitative of the present invention, and wherein FIG. 1 shows an embodiment of a beam splitter for dividing incoming radiation wavelengths according to the present invention;

FIG. 2a shows an embodiment of an optical path employing a beam-splitting device that also performs wavelength filtering according to the present invention;

FIG. 2b shows an embodiment of an optical path employing a wavelength-filtering device that is separate from the beam-splitting device;

FIG. 2c shows an embodiment of an optical path employing a beam-splitting device that splits incident radiation into three beams;

FIG. 2d shows an embodiment of an optical path for beam-splitting, wavelength filtering, and beam projection where the optical path processes a portion of the incident radiation detected by the focal plane array;

FIG. 3a shows an embodiment of a focal plane array (FPA) detector receiving incident radiation according to an embodiment of the present invention where the optical path filters all of the incident radiation detected by the focal plane array.

Figure 3B:
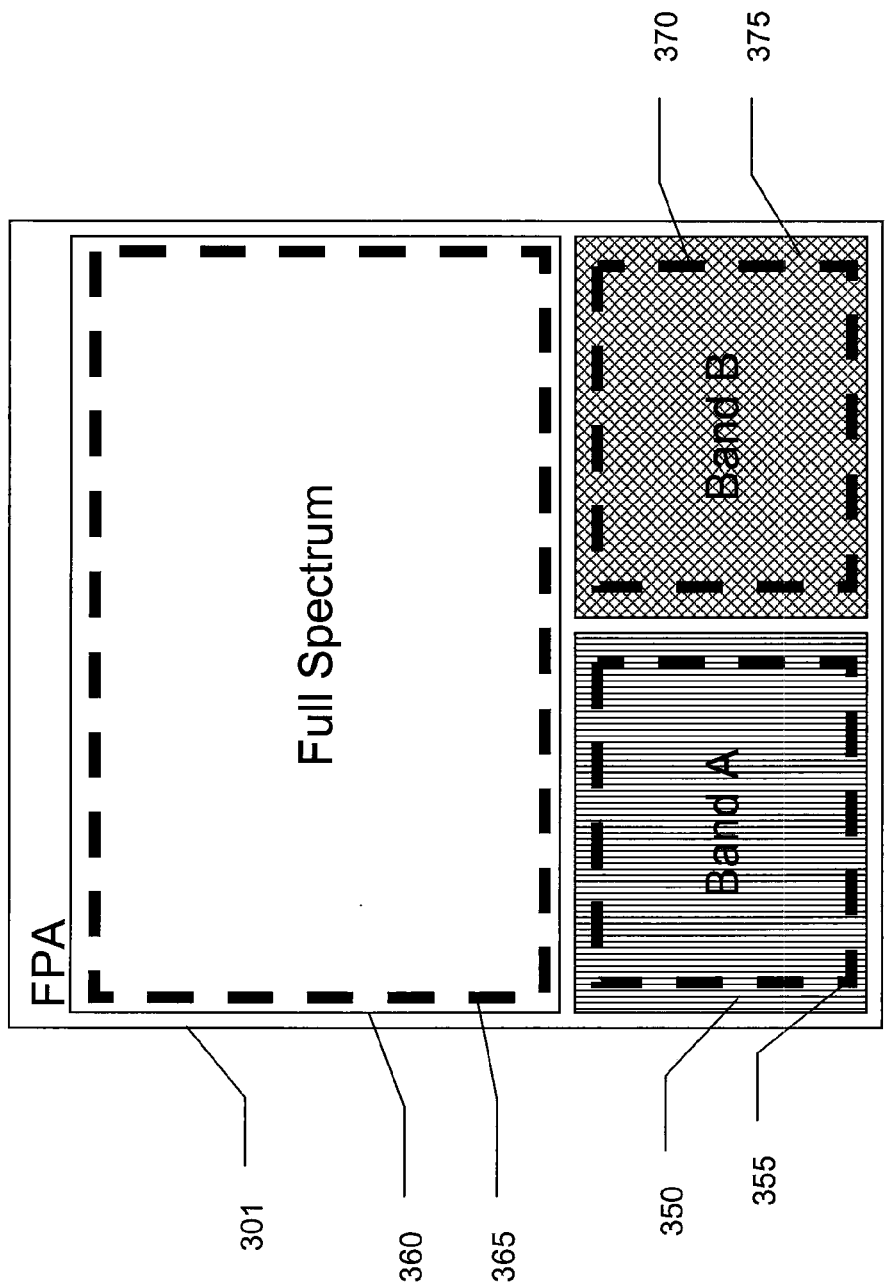
FIG. 3b shows an embodiment of a focal plane array detector receiving incident radiation according to an embodiment of the present invention where the optical path filters a portion of the incident radiation detected by the focal plane array.

The drawings will be described in detail in the course of the detailed description of the invention.

DETAILED DESCRIPTION OF THE INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The present invention seeks to address problems of accuracy, cost, and performance associated with current optical damage assessment systems. Current systems use separate detectors for different wavelengths associated with energy released by an explosive charge or similar damage-causing device, and also use a third system for maintaining tracking on the object or objects to be damaged by the damage-causing device. Such systems typically required complicated optics and beam-splitting configurations. Such configurations are not only costly, but also more prone to mechanical failure and detection errors simply by virtue of having multiple components and multiple potential points of failure. The present invention consolidates target tracking and multiple waveband damage assessment onto a single focal plane array and channels all incoming radiation that requires beam-splitting through a single beam-splitting apparatus. An embodiment of a beam-splitter according to the present invention is shown in FIG. 1. This embodiment depicts a prism 101 that splits incoming radiation into two distinct wavebands. Other devices that may perform such a function may include mirrors and fiber-optic devices.

The prism 101 splits an incoming beam into a first waveband that consists only of wavelength band "A," which corresponds to a first wavelength band associated with energy released by a munition. The prism 101 also splits the incoming beam into a second waveband that consists of waveband "B" and is associated with a second wavelength band associated with energy released by a damage-causing device. In the embodiment depicted, either band "A" or band "B" may be used for tracking the target.

In the embodiment depicted, this waveband-specific beam-splitting is accomplished by coating the faces of the prism with waveband-specific filter coatings. A first filter coating 120 only allows waveband "A" to pass through that face of the prism and a second filter coating 110 only allows waveband "B" to pass through the other face of the prism. Alternative embodiments may use prisms made of composite materials with inherent dichroic properties, or may employ a separate waveband filtering element positioned downstream of the beam-splitting element. Such a separate waveband filtering element may include a large-aperture field stop disposed between the beam-splitting element and the first set of lenses, or may be a filter coating or series of filter coatings applied to one of the lenses immediately downstream of the beam-splitting element.

In the embodiment shown, the prism 101 has an achromatic design to eliminate lateral chromatic aberration, which is a condition where spectral components of incoming radiation are angularly separated by a prism. In visible radiation, this is best understood by the phenomenon of prisms generating "rainbows" when light passes through them. This helps prevent loss signal and tracking accuracy due to blurring.

In the embodiment depicted, the prism 101 has an achromatic design. Alternative embodiments may employ a diffraction grating disposed on the beam output side of the prism to accomplish reductions in lateral chromatic aberration.

FIG. 2a shows an embodiment of an optical damage assessment system according to the present invention. The embodiment depicted employs a prism 210 of the type discussed in FIG. 1 as a beam-splitting device. In the present embodiment, the beam-splitting device 210 is depicted at the start of the beam path. Alternate embodiments of the present invention may employ something other than a prism, such as mirrors or fiber-optic components.

In the embodiment shown, multi-spectral radiation from the scene 201 passes through the waveband "A" 205 and waveband "B" 215 filter coatings disposed on the faces of the prism. Alternate embodiments of the present invention may accomplish waveband filtering during beam-splitting by using a prism composed of composite materials with specific wavelength absorption properties, or may accomplish waveband filtering after beam splitting with a field stop having filtered apertures, or an optical component composed of the appropriate wavelength absorbing materials or having different filter coatings on its top and bottom halves.

In the embodiment shown, after passing through the filter-coated beam-splitter 210, the incident beam 201 is now split into two spectrally-filtered component beams 225, 235. These beams then pass through a first lens group 220, and then through a field stop 240 before passing through a second lens group 260 and being detected by a focal plane array (FPA) 270. In the embodiment shown, the first 220 and second 260 lens groups serve two distinct purposes. The first lens group 220 focuses the radiation 225, 235 onto an intermediate focal plane at the field stop 240. This lens group may be comprised of typical infrared transmitting materials. The second lens group 260 re-focuses the two waveband-specific beams 235, 225 and images them onto the FPA 270. This lens group may also be comprised of typical infrared transmitting materials.

The field stop 240 may be employed in the present embodiment to ensure that there is no overlap between the beams 235, 225 when they are imaged onto the FPA 270. Embodiments of the present invention that do not employ a field stop may use other measures, such as spectral filtering at the focal plane array to ensure that the two beams are projected onto discrete areas of an FPA to remove or mitigate any effect of overlap between the two beams on the FPA.

Embodiments of the present invention may use more or fewer sets of optics, which may include refractive and reflective elements. Yet further embodiments of the present invention may employ specialized detector arrays instead of a regular staring FPA 270.

Embodiments of the optical system depicted may be configured such that its components are moved, either singly or as a whole, in and out of the beam path with one or more actuators (not shown). The entire arrangement may be moved by a single actuator or a set of actuators or, alternatively, a component or group of components may be associated with one or more independent actuators or actuator groups. In embodiments according to the latter, each lens group 220, 260 may be associated with a separate actuator or set of actuators that move each or both lens groups in and out of position in the beam path.

Embodiments of such an actuator or actuators may be triggered either manually or automatically depending on system configuration, or may be connected to a particular precursor activity such as triggering, arming, release or launch of a damage-causing device. In such an embodiment, the FPA 270 is used for imaging or tracking applications when the damage assessment optics are not positioned in the path of the incident radiation 201. When the various optical components 210, 220, 240, 260, are moved into position, the damage assessment functions may be initiated. These functions include spectral analysis 272 of the waveband-filtered radiation 225, 235 detected on the FPA 270 and tracking 273, in one of the detected wavebands, the location of the damage-causing event. The tracking function may be accomplished using the existing imaging components associated with the FPA 270 or with specialized components intended only for use with the damage assessment portion of the system. The spectral analysis aspect may similarly require specialized components or may be accomplished with existing portions of an imaging device containing the FPA 270.

Embodiments of spectral analysis 272 and tracking 273 units may function by receiving, as input, the output of a read-out circuit 271 associated with the FPA. In some embodiments, the FPA may have multiple read-out circuits or may have a read-out circuit with multiple outputs. Yet other embodiments may allow for the tracking and spectral analysis units to receive input only from specific read-out circuits or portions of a read-out circuit, or for either of the tracking and analysis units to receive, as input, the output of the other.

FIG. 2b shows one alternate embodiment of a beam splitter for an optical damage assessment system where the beam splitting element 210 splits the incident radiation 201 into two beams of un-filtered radiation 280, 275. An intermediate filtering element, or elements 290, 285 then performs spectral filtering to create one beam of waveband B 225 and one beam of waveband A 235. The intermediate filtering element or elements 290, 285 may be a single optical component having two filter coatings disposed thereon, it may be a combination of diffractive materials, or it may be two separate filtering elements positioned together such that each only filters one of the split beams 280, 275. Yet further embodiments of the filtering elements may include moveable or permanently positioned devices that may be moved into the beam path with an actuator, or that may be composed of an otherwise translucent or transparent material whose filtering capabilities may be selectively activated and de-activated by the application of an electric current or exposure to certain wavebands of radiation.

FIG. 2c shows an embodiment of a beam splitter for an optical damage assessment system where a beam splitting element 213 splits a beam into three beam portions 280 which are then filtered by an intermediate filtering element or elements 291, 290, 285. In this embodiment, one of the filtering elements 291 may perform no filtering, allowing the split beam 280 to pass through to the focal plane array with full spectral content 295. Alternate embodiments may use filter coatings or filter materials disposed or included in the beam splitting element 213, which may be a prism or may include mirrors or fiber-optic components or any other suitable means for splitting an incident beam of incident electro-optical radiation.

FIG. 2d shows yet another embodiment of an optical damage assessment system. In the embodiment depicted, the entire system is offset such that the incident radiation 201 only partially passes through the system. In such an embodiment, the portion of the incident radiation not passing through the damage assessment system may pass through a separate optical system (not shown) and be imaged on that portion of the focal plane array 270 not being used for optical damage assessment.

Embodiments of the system depicted may be moved into and out of the field of view of the FPA 270 as discussed above. Alternative embodiments may be fixed in position. An embodiment having a fixed position may be associated with a downstream processing system that operates continuously and in concert with an imaging system that may be used for target identification and tracking. Alternatively, an embodiment having a fixed position in the field of view of the FPA may be associated with tracking and spectral analysis features or components which may be selectively or automatically activated or otherwise not continuously in use. In one embodiment of a fixed position system, both the "A" and the "B" spectral bands may be used only for spectral analysis, with tracking being performed by an associated optical imaging system.

FIG. 3a shows an embodiment of a detector array with two waveband-filtered beams projected onto it for optical damage assessment. In the embodiment depicted, the projection of waveband "B" 310 and the projection of waveband "A" 320 are spatially separated on distinct parts of the focal plane array 301, so any image or signal processing associated with removing the effects of overlap between the two projections may be omitted.

In embodiments of the present invention, specific pixels in the FPA may be selectively addressed through a process called "windowing." Windowing allows for the read-out of detected signal from any arrangement of pixels on the FPA. In one embodiment of the present invention, contiguous rectangular windowing allows for the read-out of detection data from any contiguous rectangular area on the FPA. In such an embodiment, waveband "A" may be associated with one such pixel window on the FPA 340, and waveband "B" may be associated with a different pixel window 330 on the FPA. Alternate embodiments of the present invention may employ different windowing techniques or strategies that may permit read-out from circular, elliptical, or arbitrary polygonal areas on an FPA, or possibly from any arbitrary combination of contiguous or even non-contiguous pixels on the FPA. Embodiments of windowing strategies may be accomplished through specialized hardware devices or control programs that govern the behavior of any read-out circuits associated with the FPA.

In one embodiment of the present invention, specific spatial windows may be defined on the FPA to correspond to the expected projection areas for the two wavebands. Alternate embodiments may employ more dynamic window assignment strategies where the detected waveband "A" and "B" signal areas are used to dynamically establish, re-size, or re-locate pixel windows to the appropriate dimensions and locations on the FPA.

Alternative embodiments of windowing strategies may include approaches that allow for either automatic or user-configured window re-sizing and re-positioning, approaches that allow for the establishment and removal of different pixel windows based on an operating state of an imaging system, and approaches where pixel windows may be established based on imaging results detected by the FPA. Variations of such embodiments may also include an adjustable buffer zone to avoid window overlap or otherwise prevent detection of more than one particular beam or waveband in a window.

Because read-out time required to acquire image data from an FPA is a function of the number of pixels being addressed, the sampling rate of the FPA may be increased by a factor of two for an embodiment where the Band "A" 330 and Band "B" 340 pixel windows each take up approximately half of the FPA. Embodiments with smaller pixel windows may accomplish even further increases in sampling rate. A higher sampling rate may provide more accurate damage assessment data by taking more frequent measurements during the course of a detonation or similar damage-causing event that generates a spectral signature. The advantages of an increased sampling rate in this regard should be obvious.

FIG. 3b shows an embodiment of a detector array with two waveband-filtered beams 350, 375 and a full-spectrum imaging signal 360 projected thereon. Such an embodiment may be used in an always-on embodiment of damage assessment or one where full-spectrum imaging should not be interrupted during damage assessment (such as one where the imaging aspect performs tracking). In such an embodiment, the windowing concept may also be employed, but in this case with three windows being used. The windows in the depicted embodiment include an imaging window 365 for the full spectrum component and waveband "A" 355 and waveband "B" 370 windows for the damage assessment spectral analysis portions. Alternate embodiments may use different numbers of windows, different window arrangements, and/or different window shapes.

Embodiments of the present invention may also be useful for applications beyond damage assessment. Any environment that requires a combination of object tracking and spectral analysis may benefit from the embodiments described herein. Tracking the launch or movement of any powered craft may, for instance, be combined with a spectral analysis of its exhaust to determine the type of fuel it using. Embodiments of the system as described herein may also be useful for tracking and analyzing spectral contents of events such as munitions impacts, torch or laser cutting or welding processes, explosions or impacts involving extra-terrestrial objects, and any other of a broad range of similar events and situations.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

The invention claimed is:

1. A method comprising:
receiving incident radiation at an input aperture;
dividing at least part of the incident radiation into a first beam and a second beam;
filtering the first beam with a first waveband filter;
filtering the second beam with a second waveband filter, where the first and second wavebands are different;
focusing the first and second filtered beams onto an imaging focal plane array (FPA);
detecting the first focused beam with a first read-out window on the FPA;
detecting the second focused beam with a second read-out window on the FPA, where the first and second read-out windows do not overlap; and
spectrally analyzing beam content detected by said first or second read-out windows.

2. The method of claim 1, the method further comprising selectively activating said first and second filters.

3. The method of claim 2, where selectively activating includes positioning said filters into a beam path between said input aperture and said FPA.

4. The method of claim 1, said focusing including passing the first and second filtered beams through a field stop at an intermediate focal plane.

5. The method of claim 1, said dividing including dividing at least part of the incident radiation into a third beam; and
the method further comprising imaging the third beam with a third read-out window on the FPA, where the third read-out window does not overlap with the first and second read-out windows.

6. The method of claim 1, the method further comprising imaging that part of the incident radiation not divided into said first and second beams with a third read-out window on the FPA, where the third read-out window does not overlap with the first and second read-out windows.

7. The method of claim 6, wherein said third read-out window is larger than said first or said second read-out window.

8. The method of claim 1, the method further including tracking an event based on image data from at least one read-out window, where said event is an event associated with emission of radiation in the first or second wavebands.

9. The method of claim 8, said tracking including tracking the event based on image data from said first read-out window.

10. The method of claim 8, wherein said event is an explosion or detonation.

11. The method of claim 8, where said event is an event associated with emission of radiation in the first and second wavebands.

12. The method of claim 1, the first and second read-out windows being of equal size.

13. The method of claim 1, where spectrally analyzing includes spectrally analyzing beam content detected by said first and second read-out windows.

14. An apparatus comprising:
an input aperture that accepts incoming incident radiation;
a beam splitter that splits at least a portion of incident radiation into a first beam and a second beam;
a first waveband filter that filters the first beam such that the first beam has a first waveband;
a second waveband filter that filters the second beam such that the second beam has a second waveband, the first and second wavebands being different;
an imaging focal plane array (FPA) configured with a plurality of non-overlapping read-out windows;
an optical system in optical communication with said beam splitter and said focal plane array, said optical system focusing the first filtered beam onto a first read-out window of the FPA, and focusing the second filtered beam onto a second read-out window of the FPA,
a spectral analyzer operatively connected to said FPA, the spectral analyzer analyzing the spectral content of the beams detected by the first and second read-out windows of said FPA.

15. The apparatus of claim 14, the apparatus further comprising at least one actuator that selectively moves at least one of said beam splitter, said waveband filters, and said optical system in and out of a beam path between said input aperture and said FPA.

16. The apparatus of claim 14, where the beam splitter is a prism.

17. The apparatus of claim 16, where the first and second waveband filters are filter coatings disposed on different surfaces of said prism.

18. The apparatus of claim 14, where the first and second waveband filters are non-refractive optical components disposed downstream of the beam splitter.

19. The apparatus of claim 14, where:
the beam splitter splits at least a portion of said incident radiation into a third beam; and
the optical system focuses the third beam into a third read-out window of the FPA.

20. The apparatus of claim 14, where the beam splitter, waveband filters, and optical system are positioned in a beam path between said input aperture and the FPA such that part of the incoming incident radiation bypasses the beam splitter, waveband filters, and optical system and is detected with a third read-out window of the FPA.

21. The apparatus of claim 20, where the beam splitter, waveband filters, and optical system are permanently fixed in position relative to the focal plane array.

22. The apparatus of claim 20, where the third read-out window is larger than the first or second read-out window.

23. The apparatus of claim 14, said optical system including:
a first lens group that focuses the first and second filtered beams onto an intermediate focal plane;
a field stop that passes the focused portions of the filtered beams; and
a second lens group that focuses the passed first and second filtered beams onto the read-out windows of the FPA.

24. The apparatus of claim 14, the apparatus further including a tracker operatively connected to said FPA, the tracker tracking an event based on image data from said at least one read-out window, where said event is an event associated with emission of radiation in the first or second wavebands.

25. The apparatus of claim 24, where said tracker tracks based on image data from the first read-out window.

26. The apparatus of claim 24, where the event is an explosion or detonation.

27. The apparatus of claim 24, where said event is an event associated with emission of radiation in the first and second wavebands.

28. The apparatus of claim 14, where the first and second read-out windows are substantially equal in size.

29. The apparatus of claim 14, where the input aperture and FPA are also the input aperture and FPA for an imaging system.

30. The apparatus of claim 14, where the apparatus is disposed in a targeting, tracking, or weapon system.

31. The apparatus of claim 14, the apparatus further comprising a read-out window control module that controls the size and location of the read-out windows on the FPA.

32. An optical damage assessment system, the system including:
  an input aperture that accepts incoming incident radiation;
  a beam splitter that splits at least a portion of incident radiation into a first beam and a second beam;
  a first waveband filter that filters the first beam such that the first beam has a first waveband;
  a second waveband filter that filters the second beam such that the second beam has a second waveband, the first and second wavebands being different;
  an optical system in optical communication with said beam splitter and said focal plane array, said optical system focusing the first filtered beam onto a first read-out window of the FPA, and focusing the second filtered beam onto a second read-out window of the FPA, the optical system including:
    a first lens group that focuses the first and second filtered beams onto an intermediate focal plane;
    a field stop that passes the focused portions of the filtered beams;
    a second lens group that focuses the passed first and second filtered beams onto the read-out windows of the FPA;
  a spectral analyzer operatively connected to said FPA, the spectral analyzer analyzing the spectral content of the beams detected by the first and second read-out windows of said FPA; and
  a tracker operatively connected to said FPA, the tracker tracking an explosion, impact, or detonation based on imaging results detected by at least one read-out window, where said explosion, impact, or detonation emits radiation in the first and second wavebands;
  a read-out window control module operatively connected to the FPA, the control module controlling the size and location of the read-out windows on the FPA; and
    at least one actuator that that selectively moves at least one of said beam splitter, said waveband filters, and said optical system in and out of a beam path between said input aperture and said FPA, where the aperture and FPA of said apparatus are also the aperture and FPA of an imaging system.

* * * * *